May 14, 1968  R. R. ROBERTS  3,383,105

CARD PICK-OFF APPARATUS

Filed Aug. 23, 1966

INVENTOR.
RUSSELL R. ROBERTS

BY

ATTORNEYS

INVENTOR.
RUSSELL R. ROBERTS

BY
ATTORNEYS

United States Patent Office

3,383,105
Patented May 14, 1968

3,383,105
CARD PICK-OFF APPARATUS
Russell R. Roberts, Ontario, N.Y., assignor to Xerox Corporation, Rochester, N.Y., a corporation of New York
Filed Aug. 23, 1966, Ser. No. 574,438
6 Claims. (Cl. 271—23)

This invention relates to apparatus for dispensing articles and especially dispensers of stacked flat and bendable articles, such as microfilm aperture cards, having a sensitive surface thereon.

As is well known, in recent years, the steadily increasing size of various industries has required an enormous increase in the number and variety of business records that must be made, maintained and kept available for use. The increasing enormity of records and files made this phase of the business increasingly expensive and burdensome to the point that it was becoming economically unfeasible to continue by conventional techniques.

As one facet of the record-keeping problem, the mere protection of the records of a business may be considered. As a safeguard against the destruction of records by fire, flood, or other disaster, it became a common practice periodically to microfilm a concern's records and to store these microfilms at locations and under conditions to prevent their inadvertent destruction. Although this technique was effective to preserve the records for possible future reference, it merely added another expense to the record-keeping burden without, in any way, simplifying the handling or maintaining of records. This condition was inherent, first, since the primary purpose was to remove the microfilm records from every day use and, second, because of the relative inaccessibility of selected records contained on such microfilm.

Recently, there has been developed a system for making microfilm records whereby such records may be maintained under conditions of relative security from destruction and, at the same time, be available for day-to-day use. This system is generally known as a "unitized" microfilm system and comprises the basic steps of (1) copying onto microfilm original drawings, tracings, and memoranda, reports or other records likely to require reproduction at a later date, etc.; (2) mounting the individual microfilm frames into the apertures of microfilm data processing cards, which may be designated by coded perforations for use in conventional card-controlled of the film machines; and (3) using such microfilm cards for the reproduction of the film information thereon.

In the use of the conventional microfilm reproduction apparatus, the microfilm card comprises a conventional record card of the type widely used in record-controlled accounting and tabulating systems, but is provided with an aperture in which a microfilm frame may be inserted and permanently secured to the card. When a microfilm frame of data to be reproduced is so mounted in a microfilm card, the card may also be key punched with appropriate holes and notches representing certain descriptive terms defining, identifying or relating to the microfilm picture and placed in an index file. Thereafter, these cards may be manually or machine sorted or otherwise processed when the index file is integrated in accordance with conventional uses of such cards.

The unitized microfilm system saves the user valuable time that was previously lost by waiting for engineering prints. It has the further convenience of saving space since approximately 2,000 sq. ft. of storage space, needed for 6,000 conventional engineering drawings and the like, is reduced to 50 sq. ft. by using microfilm aperture cards. The added benefits of lack of wear and tear on original drawings and efficient and accurate control of active drawings when combined with the easy accessibility of locating and refiling the aperture cards are also important to industry.

A consistent problem with aperture cards, however, is their handling, in that the microfilm surface implanted in the aperture of such cards is relatively delicate and easily susceptible to scratching and scarring. This may occur whenever a card is moved relative to a surface with which it is in frictional contact. Many of the uses of a unitized microfilm system require the stacking of several aperture cards, one above the other, in a magazine-type stack, and the separation of such a stack by removing cards one at a time from the bottom thereof.

Before the invention herein described, generally aperture cards were removed from the bottom of a stack of such cards by a simple ejector device which forced the bottom-most card into contact with rollers or grippers or any other suitable device for the further removal of the card to whatever operations may be performed on it. Since the card is moved in a direction perpendicular to the stack above it, without first removing the sensitive microfilm surface from contact with the bottom surface of the next lower-most card in the stack, the microfilm is quite apt to be, and in fact often is, scratched or scarred or in some other way damaged. This invention eliminates that difficulty with the aperture cards by ejecting them from the bottom of the stack only after first separating the sensitive surface of the card to be removed from the remainder of the stack.

An object of this invention is to improve the handling of articles with sensitive surfaces.

Another object of this invention is to improve the handling of stacked, flat articles having a senitive surface. Yet another object of this invention is to position the bottom-most article of a stack of thin articles with delicate surfaces into a position for further operations thereon without damaging its delicate surface.

Still another object of this invention is to bottom-feed aperture cards or microfiche or the like without damaging the delicate surfaces thereof.

These and other objects of the invention are obtained by means of an apparatus having a device adapted to engage and remove one edge of the article to be removed from the bottom of the stack from the remainder of the stack and, a mechanism arranged to eject said article from the stack in a manner such that its uppermost surface is not in contact with the remainder of the stack, thereby eliminating any possible damage to the delicate surface thereof.

For a better understanding of the invention, as well as other objects and further features thereof, reference is had to the following detailed description of the invention to be read in conjunction with the accompanying drawings wherein.

Figure 1:
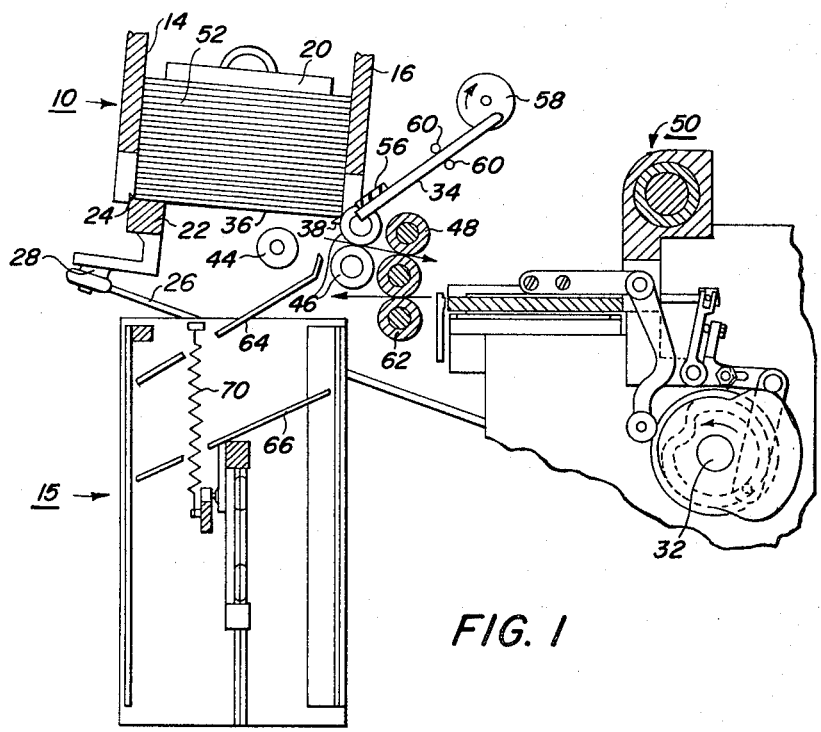
FIG. 1 is a side elevation of a card handling apparatus adapted for use in a projection system and incorporating this invention.

In the system shown in FIG. 1, microfilm aperture cards are placed in the card magazine 10 from which they are fed seriatim to a card transport in a card carriage and handling apparatus, generally designated by reference character 50 arranged to the rear of the card magazine assembly. The card carriage caused by suitable driving means to move the card past the optical axis of a light projecting system which forms the input of a machine such as a xerographic copier. The carriage is used for the purpose of scanning the image data on the card across a scanning light line. After projection of the light images, the card is ejected from the transport and deposited in the receiving magazine 15.

Seriatim feeding of the cards is effected by means of an apparatus that is an adaptation of that disclosed in Hunt Patent No. 3,180,637 issued April 27, 1965. Aperture cards are placed in card magazine assembly 10 that includes vertical guide members 12, front guide 14 and rear guide 16 for holding a stack of cards in alignment. The magazine is arranged to permit the feeding of cards from the bottom of the card stack and the magazine is adapted to retain the remaining cards in the stack as each bottom card is removed. A card weight 20 is provided to hold the cards in proper feeding relation.

For moving each card out of the magazine, the apparatus includes a movable base block 22 that supports the trailing edge of the card stack and is provided with an adjustable picker knife 24 arranged to engage the trailing edge of the lower most card of the stack. Base block 22 is suitably mounted for sliding movement along the path of ejection of the card from the magazine, and is reciprocated in timed relation to the operation of the remainder of the card handling apparatus. For this purpose, a lever 26 is pivotally mounted on a stud 28 and is connected to the base block 22 by a suitable screw. The other end of lever 26 is connected to a crank arm keyed on a cam shaft 32. The cam shaft 32 is rotated periodically through a single revolution clutch, in timed relation to the remainder of the mechanism, whereby a single card is advanced from card magazine 10, as required.

The feeding of an article is accomplished by first causing the pucker arm 34 to frictionally contact the edge of a bottom-most card 36 and force it to pucker below the spines 38 and be maintained on its bottom side only by a lip 40 at the front of the magazine 10 and by picker knife 24 on base block 22. Base block 22 and picker knife 24, operated by cam 32, forces the bottom-most card 36 with a forward motion such that the card is released from magazine lip 40 and falls into contact with rotating rolls 44 and 46 to be carried thereby and by rolls 48 to card carriage 50.

The stack of cards 52 is held from dropping through the open lower end of the magazine 10 by the spines 38 which are attached to the magazine at places adjacent the leading edge side of the cards, that is the edge of the bottom-most card 36 that will initially contact roller, on the side opposite to the lip 40 formed as an integral part of magazine 10 and, on the base block 22.

Figure 3:
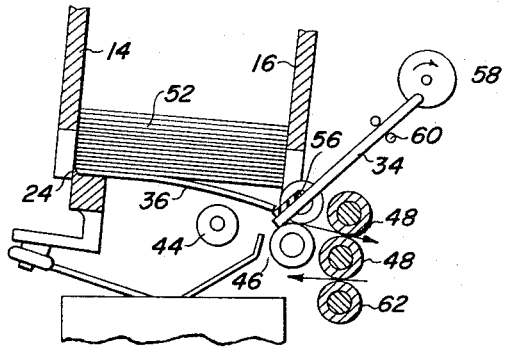
FIG. 3 is a partial side view showing ejection of the bottom-most article.
Figure 2:
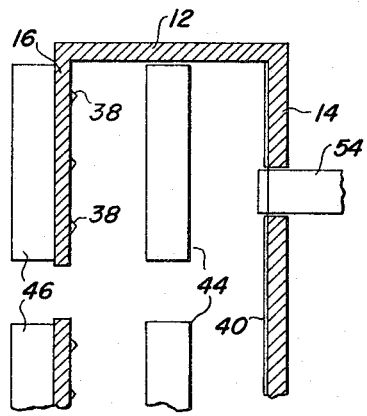
FIG. 2 is a plan view in section of a card magazine.

FIGS. 1 and 3 show a pucker arm 34 in operation on stack 52 in relation to the motion of picker knife 24 or schematic ejector bar 54. FIG. 3 shows the lower-most card 36 in a position after it has been initially contacted by the high frictional material 56 formed as an integral part of pucker arm 34. The motion of arm 34 is preferably directed by a cam 58 and pivot pins 60. Any other method of achieving the desired motion, indicated by the arrow, required to remove the card 36 from contact with spines 38 from the stack 52 while maintaining it in a flexed position is contemplated within the scope of the invention. The mechanism operates, as shown in FIG. 3, to cause arm 34 to move downwards along its length, then to rock its free end away from the sheet in a direction parallel to the ejection of the card 36. Thereafter, the picker knife 24 forces the card in a forward position for removal from the bottom of the stack by releasing it from magazine lip 40. Simultaneously, pucker arm 34 moves to its start position shown in FIG. 1. To complete the cycle, picker knife 24 moves to the rear of magazine 10 so that the now bottom-most article in the stack can position itself on base block 22 for the next sequence of operations of the pucker arm and picker knife.

As each card leaves magazine 10, it is gripped successively by two sets of feed rollers 46 and 48 and advanced rearwardly to card carriage 50 of the reciprocal carriage assembly. The upper rolls of the feed roll combination are resiliently urged into engagement with the lower rolls in order to maintain proper contact with the existing card. The rolls are driven by motor which transmit power through the shaft of lower roll 46 and rotates continuously while the apparatus is in operation. The remaining rolls are positively driven through pinions fixed on each feed roll shaft and an idler pinion whereby the two upper rolls of the sets 46 and 48 are rotated counter clockwise, as viewed in FIG. 1, and lower rolls of the sets 46 and 48 are rotated clockwise to advance the card to carriage 50, which at this point of operation is directly aligned with the feed rolls to receive the card.

Immediately following the receipt and clamping of the aperture card, the carriage 50 is moved, in a path of movement normal to the card feeding movement, to effect the image scanning operation. After the image is scanned, the carriage 50 is returned to a position in alignment with the feed rolls and the card is ejected from the transport. Thereupon, it is engaged by lower feed roll 48 that is in frictional contact with an idler feed roll 62 that is rotatably mounted to be resiliently urged into contact with the lower feed roll 48. The continued driving action of feed roll 48 is thereby effective to move the card forwardly against a deflector plate 64 that causes the card to drop downwardly and come to rest on a support plate 66 in receiving magazine 68. The support plate 66 is urged upward by spring 70 in order to minimize the possibility of cards tumbling as they are ejected from the carriage 50 and, at the same time, to provide a support plate structure that moves downwardly as additional cards are added, against the tension of spring 70, whereby a substantial number of cards may be stacked in magazine 68 before it is necessary for the operator to remove them.

The camming devices or other methods chosen to maintain the above actions of the pucker arm and ejector bar can be linked or programmed together to insure proper timing and interaction necessary to properly eject, without damaging a bottom-most, bendable card 36. Solenoids or pneumatic or hydraulic devices may be substituted for the cams shown without effecting the scope or spirit of the invention.

Figure 4:
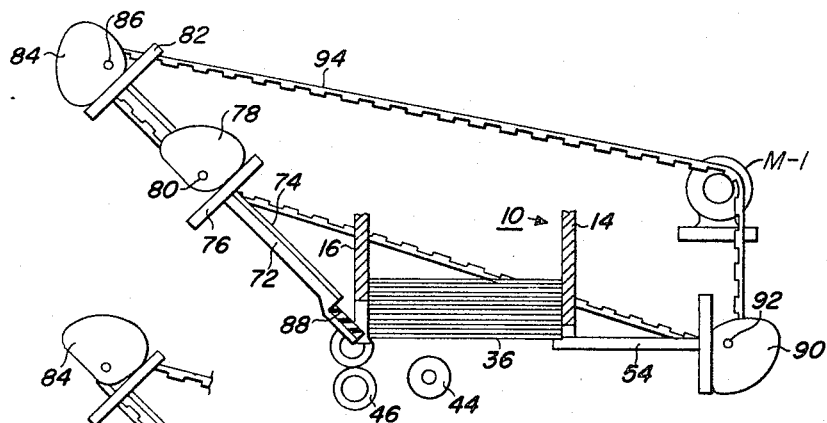
FIGS. 4, 5, 6 and 7 are fragmentary views showing the sequence of operation of a preferred embodiment of a pucker bar in operation.

FIGS. 4–7 show a sequencing of a preferred embodiment of a pucker arm 72 with a deflection maintainer 74 thereon. FIG. 4 shows the apparatus in a neutral or start position with the pucker arm above and away from the stack 52 and its lowest card 36. Guide and gripping rollers 44 and 46 may be in continuous motion or may be programmed to operate only when card 36 is approaching contact therewith. Formed as an integral part of pucker arm 72 is cam follower bar 76 positioned to ride on cam 78 mounted on shaft 80. Deflection maintainer 74 has integrally formed therewith a cam follower or rider bar 82 positioned to follow cam 84 which may be formed on shaft 80 or a second shaft 86. Cam 84 is shown here fastened to a shaft 86 for the convenience of presenting the sequencing of the apparatus in FIGS. 4–7.

Figure 5:
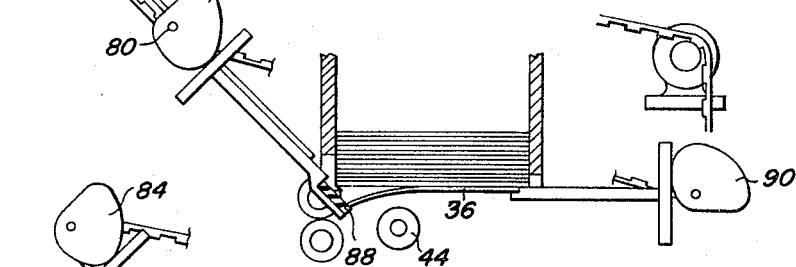

In FIG. 5 the pucker arm 72 has moved in a downward direction substantially along an axis through its length and said arm has approached frictional contact with card 36 via high frictional material 88 formed as an integral part of arm 72. The deflection maintainer 74 has not been made operative, nor has the ejector bar 54. Ejector bar 54 is positioned to reciprocally follow cam 90 as it rotates through its cycle. Shaft 92 which rotates cam 90, is driven by motor M–1 through timing belt 94 which in turn is driven by the rotation of shaft 80. This insures proper sequencing of the operation of cams 78 and 84 with cam 90, thereby providing for the ejection of a card only after its pre-positioning by the pucker arm and deflection maintainer.

Figure 6:
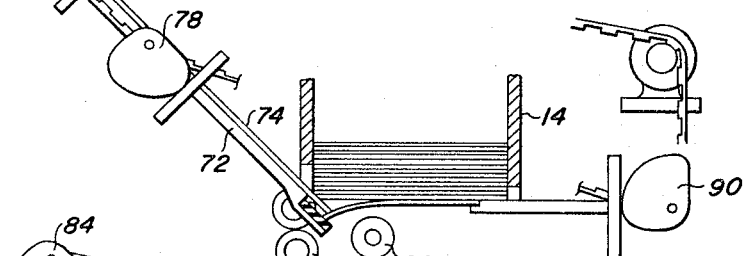

In FIG. 6, the pucker arm 72 has begun to return substantially along its original path of downward motion. The deflection maintainer 74 now engages the top portion of the leading edge of card 36, where it remains while ejector bar 54, riding on cam 90, commences its motion to eject card 36 by its rear edge from magazine 10. Card 36 is trapped beneath the deflection maintainer so that its upper surface does not contact the bottom surface of the lowest card remaining in stack 52.

Figure 7:
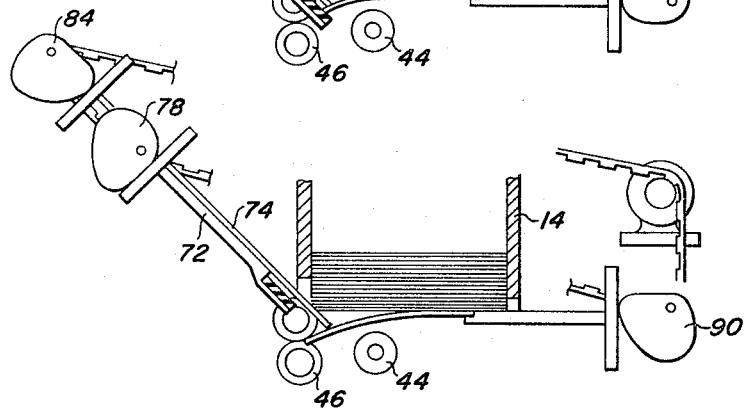

When arm 72 is fully retracted from contacting the edge of card 36 and is located above the horizontal plane of the leading edge of the deflection maintainer, as shown in FIG. 7, the ejection bar 54 moves forward pushing card 36 toward roller 46. Since the only segments of card 36 in contact with other objects are the small portions of its leading edge held against deflection maintainer 74 and its rear portion contacting the lower part of stack 52, magazine lip 40, and the lip 94 on ejector bar 54, there is relatively little contact on the major portion of the upper surface of the card. This allows the bottom feeding of cards to carriage 50 without damaging either the upper or lower surfaces through sliding or frictional contact with other cards or objects.

While the invention has been described with reference to the structure disclosed herein, it is not confined to the details set forth, and this application is intended to cover such modifications or changes as may come within the purpose of the improvements or the scope of the following claims.

What is claimed is:

1. In a dispensing apparatus for removing flat, bendable sheets from a stack supported in a magazine adapted for bottom feeding and having a retaining member in its open lower portion to prevent the slippage of sheets therethrough, the combination comprising
   pucker means operatively receivable in the magazine and adapted to engage an edge of and bend the bottommost sheet in the stack to remove the sheet from the magazine and maintain it therefrom,
   ejector means operatively receivable in the magazine engageable with the bottommost sheet, adapted to cause movement of the sheet in a direction toward said pucker means,
   and control means operatively associated with said pucker means and said ejector means for driving same in timed relationship whereby the bottommost sheet of the stack supported in the magazine is ejected therefrom.

2. The apparatus of claim 1, wherein said pucker means comprises a resilient member to engage an edge of the bottommost sheet and deflect it downwardly, and means to remove said member from contact with the edge of the sheet as the sheet is ejected by said ejector means.

3. The apparatus of claim 2 wherein said means to prevent the member from containing the edge of the sheet as the sheet is ejected comprises
   a slidable arm adjacent said resilient member, said slidable arm having further means associated therewith for causing the arm to exert a force on the top surface of the sheet whereby the engaged edge is forced out of engagement with said resilient member.

4. The apparatus of claim 3 wherein said resilient member, and said slidable arm have programming means associated therewith for causing said resilient member and said slidable arm to perform the following sequence: (1) to cause said resilient member to move downwardly, to engage the bottommost sheet; (2) to cause said slidable arm to move downwardly along a path substantially parallel to that traveled by said resilient member, whereby said slidable member will contact the sheet at the top surface thereof between the edge engaged by said resilient member and the edge engaged by said ejector means; (3) to cause said resilient member to retract along the path of its first downward motion while said slidable member remains stationary; and (4) to cause said slidable member to retract along the path of its original downward motion at a time after the bottommost sheet is ejected from the magazine by said ejector means.

5. The apparatus of claim 1, including roller means associated therewith and adapted to engage the bottommost sheet upon ejection from the magazine and to carry said sheet therefrom.

6. The apparatus of claim 1, wherein said pucker means comprises
   a rotational element,
   a lever arm having a resilient material intimately attached to one end thereof and adapted to engage an edge of the sheet,
   means to eccentrically connect the other end of said lever arm to said rotational element, and
   guide means operatively engaging said lever arm between the ends thereof and producing rocking thereof during rotation of said rotational element, said motion causing said arm: (1) to move in one direction from an original position whereby said resilient material engages the edge of the sheet; (2) to move away from the sheet in a direction parallel to the ejection of the sheet, whereby, as the sheet is ejected from the magazine by the ejector means, it will fall free of said resilient material; and (3) to return to its original position.

References Cited

UNITED STATES PATENTS

| | | | |
|---|---|---|---|
| 2,603,253 | 7/1952 | Leash | 271—44 X |
| 2,817,517 | 12/1957 | Wittkuhns | 271—23 |
| 3,273,472 | 9/1966 | Vanantwerpen et al. | 271—44 X |

ANDRES H. NIELSEN, *Primary Examiner.*